April 12, 1932. R. A. NAVARRO 1,853,449

MOTOR VEHICLE ATTACHMENT

Filed June 25, 1928

Richard A. Navarro Inventor

By Hardway Cather Attorneys

Patented Apr. 12, 1932

1,853,449

UNITED STATES PATENT OFFICE

RICHARD A. NAVARRO, OF HOUSTON, TEXAS, ASSIGNOR OF ONE-THIRD TO PAUL JONES AND ONE-THIRD TO JOHN BERLIN, OF HOUSTON, TEXAS

MOTOR VEHICLE ATTACHMENT

Application filed June 25, 1928. Serial No. 288,152.

This invention relates to new and useful improvements in a motor vehicle attachment.

One object of the invention is to provide the combination with a foot pedal, of a motor vehicle, of means associated therewith whereby the accelerator may be actuated by the lateral movement of the driver's foot without removing the foot from the pedal.

Another object of the invention resides in the combination with an accelerator and depressible pedal, of means associated therewith and so arranged that the pedal and accelerator may be operated by the foot of the driver either simultaneously or separately.

With the above and other objects in view this invention has particular relation to certain novel features of construction, operation and arrangement of parts an example of which is given in this specification and illustrated in the accompanying drawings, wherein:—

Figure 1:
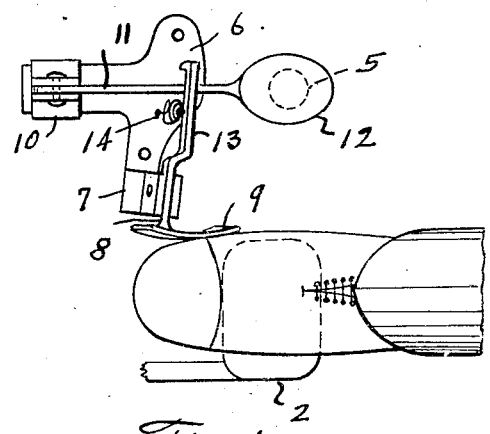
Figure 3:
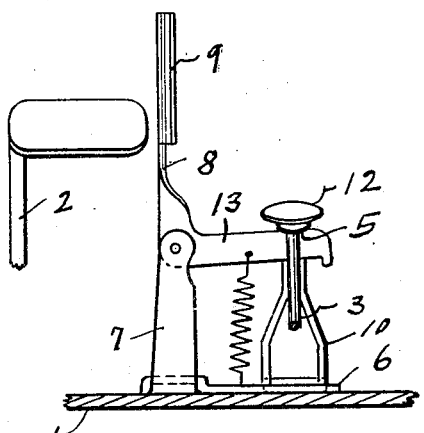
Figure 2:
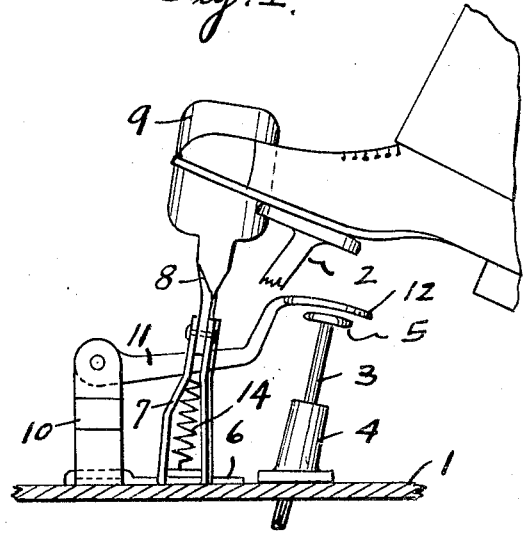

Figure 1 shows a plan view of the device.
Figure 2 shows a side elevation thereof, and
Figure 3 shows a rear elevation thereof.

Referring more particularly to the drawings, wherein like numerals of reference designate similar parts in each of the figures the numeral 1 designates the floor of an automobile. The vehicle is equipped with the usual depressible brake pedal 2 operatively connected with the brake mechanism of the vehicle in the usual way. The vehicle is equipped with the usual accelerator mechanism which includes the upstanding accelerator rod 3 which works through the upstanding bearing 4 carried by the floor of the vehicle and whose upper end has the enlarged head 5.

Fastened to the floor of the vehicle there is a plate 6 and attached to one end thereof there is an upstanding stirrup 7 having spaced arms between the upper ends of which the upstanding lever 8 is pivoted. The upper end of this lever is widened forming the concavo convex pedal 9. This pedal 9 is disposed opposite the pedal 2. Secured to and upstanding from the plate 6 there is another stirrup 10 and pivoted between the upstanding arms thereof there is another lever whose free end 12 is widened and rests on the head 5. The lower end of the lever 8 has a laterally extending arm 13 whose free end is disposed above the lever 11 and a spring 14 has one end attached to the arm 13 and its other end connected to the brace 6 and this spring holds the arm 13 against the lever 11 and holds said lever against the head 5 and prevents rattling of the parts.

In driving a motor vehicle it is, at times at least, desirable to keep the foot on the brake pedal and at the same time to feed additional motive fluid to the motor. This can be accomplished, by the use of the device herein described, by the lateral movement of the foot on the brake pedal, and the brake and accelerator can be operated separately or simultaneously without removing the foot from the brake pedal.

While I have shown what I now consider the preferred form of the invention it is obvious that mechanical changes may be made therein and equivalents substituted for the parts shown, and I reserve the right to make such mechanical changes and substitutions found desirable and such as are comprehended within the scope of the appended claims.

What I claim is:—

1. In a motor vehicle having a depressible pedal and an accelerator; an upstanding lever adjacent said pedal, a second lever operable upon said accelerator, an arm carried by said upstanding lever forming therewith a bell crank and in operative relation with the other lever whereby said accelerator may be depressed by a side movement of the foot of the driver of the vehicle.

2. In a motor vehicle having a depressible pedal and an accelerator; an upstanding lever adjacent said pedal, a second lever operable upon said accelerator, an arm carried by said upstanding lever and in operative relation with the other lever, and a yieldable member normally holding said arm in contact with the lever to be operated thereby.

3. In a motor vehicle having a depressible pedal and a carbureter controlling device; an upstanding laterally movable pedal, adjacent said depressible pedal, a lever disposed to actuate said controlling device, an arm carried by said laterally movable pedal and adapted to engage and depress said lever.

4. In a motor vehicle having a depressible pedal and a carbureter controlling device; an upstanding laterally movable pedal, adjacent said depressible pedal, a lever disposed to actuate said controlling device, an arm carried by said laterally movable pedal and adapted to engage and depress said lever, and means normally holding said arm yieldingly against said lever.

In testimony whereof I have signed my name to this specification.

RICHARD A. NAVARRO.